Patented Feb. 19, 1935

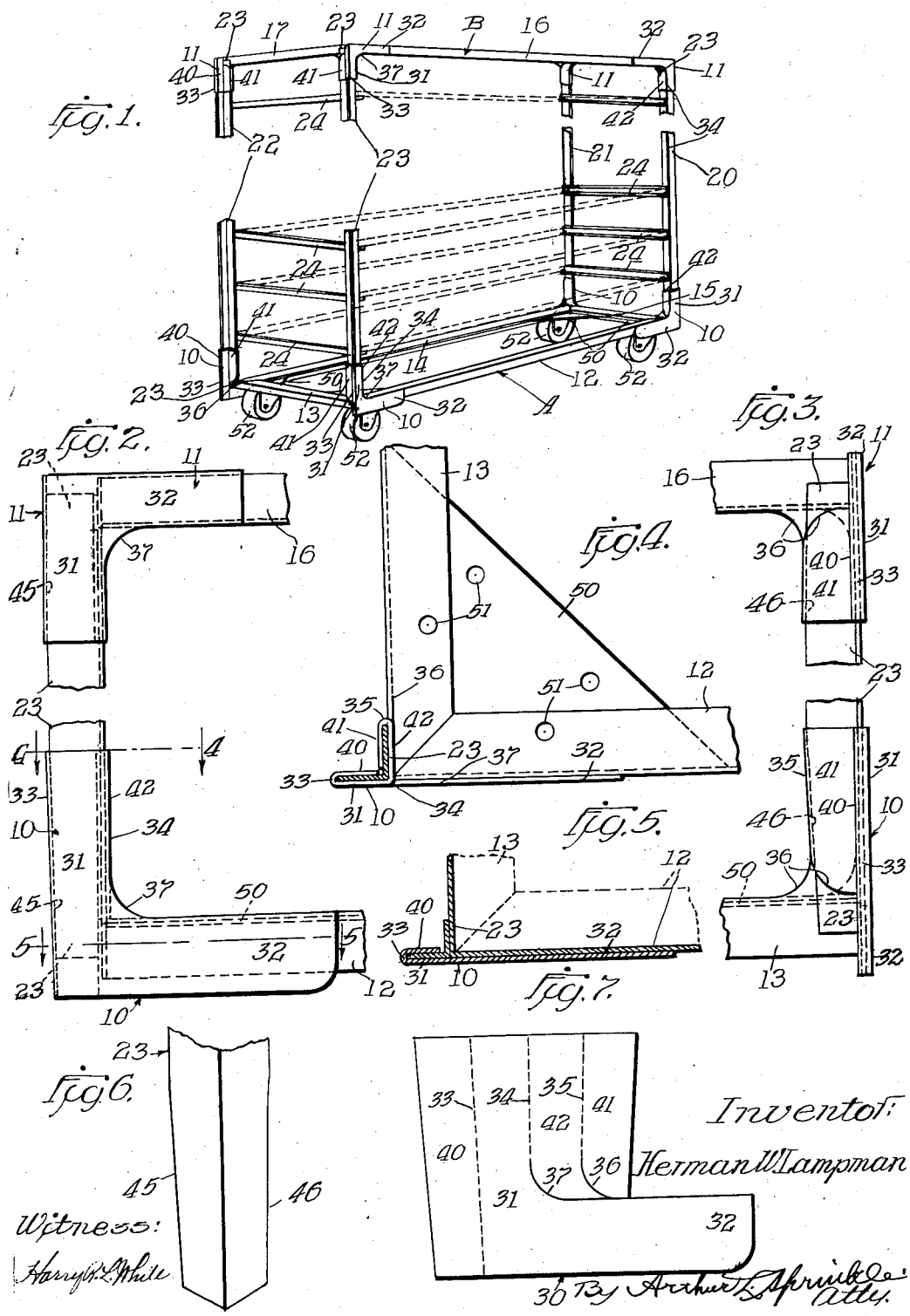

1,991,397

UNITED STATES PATENT OFFICE 1,991,397

METALLIC FRAME STRUCTURE

Herman W. Lampman, Huntington, Ind., assignor to Henry L. Schroeder, Chicago, Ill.

Application December 31, 1932, Serial No. 649,695

5 Claims. (Cl. 211—182)

The invention relates to a metallic frame structure adapted for use in racks and analogous structures as portable bread racks, pan racks, cake racks, pie racks, proof boxes, metallic work tables and other similar articles as used particularly by bakers although my invention is applicable in other relations or frame structures employing commercial metallic forms as angle irons, channel bars or flat metallic bars in their frame construction, particularly where it is desired to build up a metallic supporting frame work of a knock-down form or construction.

It is the primary object of my invention to provide an improved construction of knock-down metallic frame work adapted for assembly to produce a rack or supporting device for shelves as in bread racks, cake racks, pie racks, and the like.

It is a further object of my invention to provide an improved construction of knock-down or detachable metallic corner joint for detachably connecting horizontal and vertical metallic bars as angle iron forms in their respective vertical and horizontal positions in relation to each other.

It is a further object of the invention to provide an improved construction of corner connector for joining in angular relation metallic bars or forms of angle iron, which corner connector may be made by stamping operation from ductile sheet metal suitable for attachment also to certain of the parts to be connected therewith by brazing and the like.

It is a further object of the invention to provide an improved form of metallic frame work for a bread rack having top, bottom and vertical corner connections therebetween, the said top, bottom and corner connections being detachably related so that the top and bottom members may be disconnected from the corner supports to provide a knock-down package for transportation and the like which may be readily assembled for use by the employment only of ordinary tools as hammers to wedgingly engage the co-acting parts of the structure together into a supporting frame structure ready for use without the necessity for the use of connecting or locking bolts and the like.

It is a further object of the invention to provide an improved metallic corner connecting joint of ductile sheet metal which may be formed by a stamping operation and brazed to detachably connect together in angular relation a rectangular frame formed of angle iron and a corner member also of angle iron construction to be held at substantially right angles to the plane of said rectangular angle iron frame, the said device being adapted to receive and securely hold the detachable angle iron member of the joint in a detachable wedging relation therein that will not develop objectionable play or looseness between the joint parts, and without the employment of bolts, pins or other locking devices.

Other objects of the invention will appear from the following description which is directed to the preferred embodiment thereof as depicted in the accompanying drawing forming a part of the specification, the novel features being set forth in the appended claims.

In the said drawing:

Fig. 1 is a perspective, elevational view of a frame structure of a portable bread rack embodying the invention, a portion of the rack structure between the top and bottom members of the frame work thereof being broken away for simplification of the drawing.

Fig. 2 is an enlarged, fragmentary side view of one of the corner top and bottom portions of the frame structure of the rack, and Fig. 3 is a view of the same structure taken at right angles to the view shown in Fig. 2, it being understood that the fragmentary elevational views of Figs. 2 and 3 are taken looking toward the respective side and end corner portions of the rack frame work.

Fig. 4 is a fragmentary, horizontal, sectional view taken approximately on line 4—4 of Fig. 2 looking in the direction indicated by the arrows, and Fig. 5 is a similar sectional view taken on line 5—5 of Fig. 2 as indicated by the arrows.

Fig. 6 is a fragmentary view showing the construction of one of the terminal portions of the corner posts of the bread rack structure in which the invention is embodied, and Fig. 7 is a diagrammatic view showing the manner in which a portion of metallic sheet material is cut prior to bending to form one of the improved corner sockets employed in connection with the invention.

The bread rack in which the invention is embodied is shown to be of angle iron construction which is the general form of frame work preferred although other metallic frame bars of different form in cross section may be employed without departing from the purpose and spirit of the invention by slight modifications of the construction of the corner sockets in order that the socket portions therein may be of the desired form to detachably connect various detachable portions of the frame work. In the embodiment of the invention in the bread rack shown, I provide two rectangular frames of angle iron, the bottom frame being generally designated at A and the top frame at B. The frames A and B as shown are each formed of four angle iron bars permanently connected in the respective corners of the frames by the four bottom corner connecting members 10 while the rectangular frame B, which comprises four corner connected angle iron bars is united by the socket connectors 11 as shown in Fig. 1, these angle iron bars in the bottom frame A being designated by reference characters 12 to 15 inclusive while the angle bars in the detachable top frame B are designated by reference characters 16 and 17, only two of the four necessarily employed being shown in the drawing. The corner connectors 10 and 11 are each socketed in a manner to be presently described to detachably receive in wedging engagement therewith the angle iron vertical corner supports 20 to 23 inclusive, the latter being given a special formation near each of the extremities thereof to adapt them to proper co-operating wedging relation with the socketed portions of the corner brackets 10, 11 as illustrated in the fragmentary view of the corner member 21, Fig. 6.

The vertical corner struts or supports of angle iron 20 to 23 inclusive being detachable from the corner socket members 10 and 11 of the top and bottom frames of the structure are preferably permanently connected by shelf supports or guides 24, which will preferably be made of angle iron with one of the legs of the angle secured flat to the inner surfaces of the corner members and with the other leg of the angle arranged at the bottom thereof and extending inwardly to form a slide guide or support for the usual detachable shelves on which bread or other articles are placed in the type of rack in which the invention is shown embodied. The attachment of the shelf supports 24 between the end corner members 20, 21 and 22, 23 respectively, will preferably although not necessarily be made by brazing the slide connectors 24 to their supporting corner members and when this is done, it will be seen that aside from the detachable shelves of the rack, the supporting frame work proper thereof will consist of four parts, namely, the lower and upper detachable frames A and B respectively, and the two end parts comprising the corner members 20, 21 and 22, 23 respectively, permanently connected together in pairs by the angle iron shelf supports 24.

Shelves of any desired construction may be employed in connection with the shelf supports 24 and as is usual in such structures will be detachably related to the shelf supporting end members 24.

An important feature of my invention resides in the construction of the corner connecting brackets 10 and 11 by which the angle iron bars 12 to 15 of the bottom frame A and the similar angle iron members in the top frame B of which there are four, of which one side member 16 and one end member 17 are shown in the drawing, are connected together in permanent relation and which sockets in turn detachably unite in a wedging, socketed relation with the vertical corner standards 20 and 23 inclusive.

In Figs. 2 to 5 inclusive and in Fig. 7 will be shown the details of construction entering into the production of the corner bracket and socket members 10 and 11 and the description will be simplified by the observation that the socketed corner members 10 and 11 are identical in construction and mode of operation except for the fact that on account of the somewhat greater or heavier supporting function of the lower brackets 10, I prefer to make the latter, although substantially the same gauge of material, of slightly less dimensions in certain respects as hereinafter pointed out merely for the purpose of conserving material and reducing weight.

The construction of the special socketed corner members 10 and 11 may be understood by reference first to Fig. 7 which illustrates in plan view the manner in which a sheet of metal will be cut before introduction into bending and forming dies to produce the completed members 10 and 11. The reference character 30 designates generally the metallic blank required for making either of the members 10 and 11 and the same, it will be seen, consists of a substantially rectangular body 31 and a tangent-like projection 32. The dotted lines 33, 34 and 35 denote lines of fold and the continuous, partially curved lines 36, 37 designate cuts into the body of the blank 30 to prepare the portions thus freed for bending along the dotted lines 35 and 34 in the manner of the completed brackets as shown in Figs. 2 to 5 inclusive.

Referring first to one of the lower brackets 10, and with reference to the proportions of the various parts as shown in Figs. 2 to 7 inclusive, it will be seen that when the blank, designated at 30 in Fig. 7 is prepared in the manner illustrated, the material may be bent or creased substantially on the line 33 to provide the overlapping member 40 as shown most clearly in Fig. 4 which will cooperate with the partially severed sections of the blank as bounded by the dotted lines 34 and 35 which, when bent or formed in the manner illustrated most clearly in the sectional view, Fig. 4, will cause the member 41 to meet the inner edge of the part 40 thus forming a socket for the reception of one end of one of the vertical corner angle members 20 to 23 inclusive. These corner angle members 20 to 23 inclusive will, after the manner shown in connection with corner member 21 in Fig. 6, be tapered near their extremities by having each of the legs of the angle narrowed from a suitable distance inward of the extremities toward the outer end thereof, thus producing angular or wedge-like surfaces as designated at 45, 46 in Fig. 6. The lines of fold 33 to 35 inclusive, when the blanks are being folded, will be gradually narrowed toward one end of the blank so that when the properly formed corner brackets 10 and 11 are presented to the tapered legs of the corner angle bars 20 to 23 inclusive, a gradually inwardly diminishing socket will be presented to the tapered corner angles so that the brackets 10 and 11 may receive the corner members with a wedge-like action and the top and bottom portions of the frame united to the corner posts by driving the parts together and securely held by the friction set up because of the co-operating wedging portions of the sockets and corner posts.

From the above description taken in connection with the character of the blank illustrated in Fig. 7 from which the socketed brackets 10 and 11 are formed, it will be seen that the parts 40, 41 and 42 may be bent around so that the terminal edges of the portions 40 and 41 may come together in the manner illustrated in Fig. 4 at substantially right angles and in this position they will preferably be soldered or brazed together preferably by an electric or acetylene process to produce a socket for the vertical angular corner members having great power of resistance. The leg 32 of the blank 31 as shown in Fig. 7 will provide a strengthening extension for overlapping the angles of the bottom and top frames in the manner so that the extension 32 overlaps the bottom frame angle 12 or the top frame angle 16 in Fig. 2, it being understood as before stated, that there will be no difference in the essential features of construction of the top corner brackets 11 from that of the lower brackets 10 with the possible exception that I find it possible to conserve material by shortening the dimensions of the blank 30 thereby shortening the panels 40, 41 and 42 and I find also that on the upper bracket it is desirable to conserve material by decreasing the length of the frame angle overlapping branch 32 and also decreasing the width of this part somewhat to bring it substantially to a width equal to the width of the leg of the top angles as the angle 16, while for strengthening purposes I prefer to have the part 32 of brackets 10 wider than the lower angles to overhang the same for strengthening purposes at the bottom in the manner shown and described.

In the construction of the bottom and top frame members of the rack A and B respectively, I prefer to have the frame members 12 to 15 inclusive cut with the lower legs angularly formed as shown in Fig. 4. These parts are then brought together and they may conveniently be united by brazing and having on the bottom side thereof a plate 50 as shown in Fig. 4 brazed thereto, there being a plurality of spaced holes 51 provided to take bolts for the attachment of a suitable swivelled bracket for supporting near each corner of the frame a castor wheel or roller 52.

When the side and end angles of the bottom frame are thus united, the corner brackets 10 formed in the manner illustrated and described from the blank 30 of Fig. 7 may be placed in position as illustrated in Figs. 2 to 5 inclusive with the projecting portion 32 overlying the angle bar 12 and with the lower projection of the panel or part 42 resting flush with the top of one of the end angle bars of the lower frame as, for example, the angle bar 13 in which position both the lower end of the panel 42 and the upper edge of the part 32 will be firmly brazed or welded to the contacting edge of the respective lower frame angle bars 12 and 13 all of which will result in firmly uniting the corner bracket socket members 10 to the lower frame in a permanent and rigid manner for the reception of the respective vertical standards 20 to 23 of the rack.

The same procedure will be followed in connecting the similar upper socket brackets 11 in the corners formed by the side and end members 16, 17, the parts being brazed or welded together in the same manner and with the four corners of each of the upper and lower frame members thus united, it will be seen that they will be provided with the respective upwardly and downwardly extending socket portions tapered in the manner heretofore described to receive the tapered ends of the corner angles to produce a drive fit in uniting the parts of the rack frame together. This permanent union may be secured by driving the parts together with a hammer and they may be as readily disconnected by the use of a hammer or similar tool when it is desired to knock down the frame work of the rack in the manner described and reduce the same to a four piece structure that may be closely piled for shipping or storing purposes after the detachable shelves have been removed from their respective end supports 24 connecting the two respective pairs of vertical corner angles into a pair of detachable end frames.

My improved construction produces a knock down rack for use in bakeries and other analogous purposes that may be cheaply and economically and readily assembled or disassembled and that without the use of bolts or screws for connecting various parts in their assembled relation.

It will furthermore be seen that by reason of the brazing of the corner bracket sockets to the frame sections, and the brazing of the shelf supports to the corner members of the rack frame, a most solid and substantial construction is provided at a minimum of expense and which will entirely obviate much of the time heretofore used in setting up and tearing down rack structures of the character to which the invention is shown applied.

In order that the invention might be understood the details of the preferred embodiment have been set forth and the invention has been showed applied to a specific form of bread rack but it is not desired to be limited in this respect except as specified in the claims because it will be apparent that persons skilled in the art may apply the invention in various other relations without departing from the purpose and spirit of my invention.

I claim:

1. A metallic frame structure for bread racks and the like, comprising a pair of frames formed of metallic angle iron bars, the frame of each said pair being provided with a plurality of corner connecting socketed brackets brazed thereto with the socketed openings therein being inwardly tapered and extending substantially at right angles to the plane of said frames and opening toward each other, and quick detachable metallic connecting bars of angle iron construction being provided with tapered terminals for engaging the sockets of said brackets to support said frames in spaced-apart relation.

2. A metallic frame structure for bread racks and the like, comprising a pair of substantially rectangular frames formed of angle iron bars, a plurality of socketed brackets of sheet metal construction permanently attached to each of the respective frames with the socketed openings therein opening toward each other, the said socketed openings being tapered, a plurality of metallic connecting bars of angle iron construction, the terminals of which are tapered to correspond with the said tapered socket openings of the brackets to form quick detachable joint connections, and shelft supporting means carried by said connecting bars.

3. A metallic frame structure for bread racks and the like, comprising a pair of substantially rectangular frames each formed of a plurality of joined angle iron bars, socketed brackets permanently attached by brazing or welding to the respective corners of the said angle iron frames, there being portions of the said brackets extending from each of the respective corners of the frames along the outside of each of the angle bars and being brazed or welded thereto, the said sockets in the brackets being tapered and of angular formation to receive an angle iron corner support, and a plurality of angle iron corner supports having tapered terminals adapted to co-operate with the said tapered socketed openings of the brackets to support the said frames in spaced-apart detachable relation.

4. A metallic frame structure for bread racks and the like, comprising a pair of substantially rectangular frames each formed of a plurality of joined angle iron bars, socketed brackets permanently attached by brazing or welding to the respective corners of the said angle iron frames, there being portions of the said brackets extending from each of the respective corners of the frames along the outside of each of the angle bars and being brazed or welded thereto, the said sockets in the brackets being tapered and of angular formation to receive an angle iron corner support, a plurality of vertical angle iron corner supports having tapered terminals adapted to cooperate with the said tapered socketed openings of the brackets to support the said frames in spaced-apart detachable relation, and a plurality of shelf supports or guides permanently attached to each adjacent pair of said connecting bars for permanently joining them together in unitary end frames whereby the said frame structure is capable of being collapsed and reduced to a four piece knock down condition for compact assemblage in transportation, storage and the like.

5. As an article of manufacture, a knock-down frame structure adapted for assembling to form a portable bread rack and comprising two rectangular metallic angle iron bar frames each connected together at their respective corners by brackets formed of ductile sheet metal and the said top and bottom frames being connected by angle iron corner standards provided with tapered extremities, the said sheet metal corner brackets being formed from a sheet metal blank having a body portion adapted to be connected to the angle frame members by brazing and having an angularly extending integral portion with connected foldable extensions bent at right angles to each other and folded upon each other to form an angular, inwardly tapering socket adapted to support the tapered extremities of the legs of the angle iron corner supports.

HERMAN W. LAMPMAN.